United States Patent
Andra et al.

(10) Patent No.: US 10,817,593 B1
(45) Date of Patent: Oct. 27, 2020

(54) USER INFORMATION GATHERING AND DISTRIBUTION SYSTEM

(71) Applicant: Wells Fargo Bank, N.A., San Francisco, CA (US)

(72) Inventors: Venu Andra, San Francisco, CA (US); Balinder Mangat, Castro Valley, CA (US); Tabari D. Williams, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 247 days.

(21) Appl. No.: 15/385,035

(22) Filed: Dec. 20, 2016

Related U.S. Application Data

(60) Provisional application No. 62/272,422, filed on Dec. 29, 2015.

(51) Int. Cl.
*G06F 21/32* (2013.01)
*H04L 29/06* (2006.01)

(52) U.S. Cl.
CPC ............ *G06F 21/32* (2013.01); *H04L 63/083* (2013.01); *H04L 63/0861* (2013.01); *H04L 2463/082* (2013.01)

(58) Field of Classification Search
CPC ... G06F 21/32; H04L 63/083; H04L 63/0861; H04L 2463/082
See application file for complete search history.

(56) References Cited

U.S. PATENT DOCUMENTS

| 6,526,125 B1 * | 2/2003 | Lindsay | H04Q 3/72 379/45 |
| 7,162,451 B2 | 1/2007 | Berger et al. | |

(Continued)

FOREIGN PATENT DOCUMENTS

| WO | WO-2017/190175 A1 | 11/2017 |
| WO | WO-2018/126077 A1 | 7/2018 |

(Continued)

OTHER PUBLICATIONS

Liu—The Organizational Structure in Collaboration Information Gathering, 2001, IEEE, pp. 263-268 (Year: 2001).*

(Continued)

*Primary Examiner* — Luu T Pham
*Assistant Examiner* — James J Wilcox
(74) *Attorney, Agent, or Firm* — Foley & Lardner LLP

(57) ABSTRACT

Systems and methods relating to alerting users as to user information to be exchanged during transactions. A user information system (UIS) information circuit and an associated user information database populates an account with user information received from at least one of the user and a plurality of entities. A user information request relating to a transaction is received from an entity computing system associated with an entity over a network via a network interface circuit. A security circuit sends an alert including an approval request containing an identification of user information requested in the user information request to a user computing device associated with the user over the network. The security circuit receives an approval of the approval request from the user computing device, and the UIS information circuit provides the approved information to the entity to complete the transaction.

12 Claims, 7 Drawing Sheets

(56) References Cited

U.S. PATENT DOCUMENTS

| | | | |
|---|---|---|---|
| 7,769,633 B2* | 8/2010 | Jokinen | G06Q 30/02 370/328 |
| 8,214,291 B2* | 7/2012 | Pelegero | G06Q 20/10 705/44 |
| 8,260,806 B2 | 9/2012 | Steele et al. | |
| 8,364,567 B2* | 1/2013 | Shnowske | G06Q 40/00 705/35 |
| 8,429,068 B1* | 4/2013 | Fasoli | G06Q 40/02 705/1.1 |
| 8,429,072 B1* | 4/2013 | Sheehan | G06Q 20/10 705/39 |
| 8,825,757 B2 | 9/2014 | Lunt et al. | |
| 9,105,032 B2* | 8/2015 | Altberg | G06Q 30/02 |
| 9,195,834 B1* | 11/2015 | Jakobsson | G06F 21/31 |
| 9,210,177 B1* | 12/2015 | Hughes | H04L 63/08 |
| 9,330,398 B2* | 5/2016 | Klein | G06Q 30/0208 |
| 9,503,451 B1* | 11/2016 | Kane-Parry | H04L 63/083 |
| 9,635,000 B1 | 4/2017 | Muftic | |
| 9,749,140 B2 | 8/2017 | Oberhauser et al. | |
| 9,838,384 B1* | 12/2017 | Kane-Parry | H04L 63/083 |
| 9,870,562 B2 | 1/2018 | Davis et al. | |
| 10,026,082 B2 | 7/2018 | Davis | |
| 10,097,356 B2 | 10/2018 | Zinder | |
| 10,102,510 B2 | 10/2018 | Yau et al. | |
| 10,121,143 B1 | 11/2018 | Madisetti et al. | |
| 10,163,079 B1 | 12/2018 | Brock et al. | |
| 10,255,589 B1* | 4/2019 | Petruzzi | G06Q 20/10 |
| 2003/0028427 A1 | 2/2003 | Dutta et al. | |
| 2004/0147265 A1* | 7/2004 | Kelley | G06Q 30/02 455/445 |
| 2005/0086531 A1* | 4/2005 | Kenrich | G06F 21/604 726/4 |
| 2006/0004651 A1* | 1/2006 | Corr | G06Q 40/02 705/38 |
| 2008/0129447 A1* | 6/2008 | Choi | H04L 63/04 340/5.61 |
| 2008/0172382 A1* | 7/2008 | Prettejohn | H04L 63/126 |
| 2008/0209213 A1* | 8/2008 | Astrand | H04L 63/083 713/168 |
| 2009/0260064 A1* | 10/2009 | McDowell | H04L 63/083 726/4 |
| 2010/0031043 A1* | 2/2010 | Burger | G06F 21/32 713/170 |
| 2010/0036772 A1* | 2/2010 | Arceneaux | G06Q 20/045 705/50 |
| 2010/0070377 A1* | 3/2010 | Williams | G06Q 20/06 705/26.1 |
| 2012/0011016 A1* | 1/2012 | Williams | G06Q 30/0601 705/26.1 |
| 2012/0066262 A1 | 3/2012 | Greenberg | |
| 2012/0171990 A1* | 7/2012 | Williams | H04W 4/24 455/406 |
| 2013/0006862 A1* | 1/2013 | Graham | G06Q 20/40 705/44 |
| 2013/0061091 A1* | 3/2013 | Moore | G06F 11/1443 714/18 |
| 2013/0159119 A1* | 6/2013 | Henderson | G06Q 20/3224 705/21 |
| 2013/0332342 A1 | 12/2013 | Kasower | |
| 2014/0012757 A1* | 1/2014 | Henderson | G06Q 20/3224 705/44 |
| 2014/0087690 A1* | 3/2014 | Williams | H04W 4/24 455/406 |
| 2014/0088987 A1* | 3/2014 | Backhaus | G06F 19/321 705/2 |
| 2014/0089121 A1* | 3/2014 | Kaminsky | G07G 3/003 705/23 |
| 2014/0108170 A1* | 4/2014 | Tamari | H04M 17/201 705/16 |
| 2014/0172724 A1* | 6/2014 | Dua | G06Q 20/20 705/76 |
| 2014/0244496 A1* | 8/2014 | Langus | G06Q 20/3674 705/41 |
| 2014/0297433 A1* | 10/2014 | Bielamowicz | G06Q 20/401 705/18 |
| 2014/0297438 A1* | 10/2014 | Dua | G06Q 20/20 705/21 |
| 2014/0310160 A1* | 10/2014 | Kumar | G06Q 20/42 705/39 |
| 2014/0337503 A1* | 11/2014 | Hefetz | G06Q 20/32 709/223 |
| 2015/0058931 A1* | 2/2015 | Miu | G06Q 20/4016 726/3 |
| 2015/0131870 A1* | 5/2015 | Hudson | G06F 3/0483 382/112 |
| 2015/0237026 A1* | 8/2015 | Kumar | G06F 21/44 726/28 |
| 2015/0381603 A1* | 12/2015 | Jakobsson | G06F 21/31 726/5 |
| 2016/0012446 A1* | 1/2016 | Parnell | G10L 17/22 705/18 |
| 2016/0048700 A1* | 2/2016 | Stransky-Heilkron | G06F 17/30864 707/785 |
| 2016/0072840 A1* | 3/2016 | Iyer | H04L 63/1408 726/1 |
| 2016/0110771 A1* | 4/2016 | Klein | G06Q 30/0208 705/14.39 |
| 2016/0342989 A1 | 11/2016 | Davis | |
| 2016/0342994 A1 | 11/2016 | Davis | |
| 2016/0371697 A1* | 12/2016 | Auvenshine | G06Q 20/4016 |
| 2017/0046698 A1 | 2/2017 | Haldenby et al. | |
| 2017/0132630 A1 | 5/2017 | Castinado et al. | |
| 2017/0243208 A1 | 8/2017 | Kurian et al. | |
| 2017/0250972 A1 | 8/2017 | Ronda et al. | |
| 2017/0293912 A1 | 10/2017 | Furche et al. | |
| 2017/0352012 A1 | 12/2017 | Hearn et al. | |
| 2018/0025442 A1 | 1/2018 | Isaacson et al. | |
| 2018/0060496 A1 | 3/2018 | Bulleit et al. | |
| 2018/0068130 A1 | 3/2018 | Chan et al. | |
| 2018/0075421 A1 | 3/2018 | Serrano et al. | |
| 2018/0089256 A1 | 3/2018 | Wright, Sr. | |
| 2018/0096349 A1 | 4/2018 | McDonald et al. | |
| 2018/0114218 A1 | 4/2018 | Konik et al. | |
| 2018/0130050 A1 | 5/2018 | Taylor et al. | |
| 2018/0204191 A1 | 7/2018 | Wilson et al. | |
| 2018/0227275 A1 | 8/2018 | Russinovich et al. | |
| 2018/0308072 A1 | 10/2018 | Smith et al. | |
| 2018/0315055 A1 | 11/2018 | Pickover et al. | |
| 2018/0316507 A1 | 11/2018 | Smith et al. | |
| 2018/0322588 A1 | 11/2018 | Linne | |
| 2018/0343120 A1 | 11/2018 | Andrade | |
| 2018/0343126 A1 | 11/2018 | Fallah | |
| 2018/0349896 A1 | 12/2018 | Arora et al. | |
| 2018/0349968 A1 | 12/2018 | O'Brien et al. | |
| 2018/0367310 A1 | 12/2018 | Leong et al. | |
| 2018/0373983 A1 | 12/2018 | Katz et al. | |
| 2019/0012662 A1 | 1/2019 | Krellenstein et al. | |
| 2019/0018984 A1 | 1/2019 | Setty et al. | |
| 2019/0019144 A1 | 1/2019 | Gillen | |
| 2019/0019180 A1 | 1/2019 | Coburn et al. | |
| 2019/0020653 A1 | 1/2019 | Brown et al. | |
| 2019/0020661 A1 | 1/2019 | Zhang | |
| 2019/0026685 A1 | 1/2019 | Chappell et al. | |
| 2019/0028276 A1 | 1/2019 | Pierce et al. | |
| 2019/0034716 A1 | 1/2019 | Kamarol et al. | |
| 2019/0035018 A1 | 1/2019 | Nolan et al. | |
| 2019/0036887 A1 | 1/2019 | Miller | |
| 2019/0043050 A1 | 2/2019 | Smith et al. | |

FOREIGN PATENT DOCUMENTS

| | | |
|---|---|---|
| WO | WO-2018/165472 A1 | 9/2018 |
| WO | WO-2018/172439 A1 | 9/2018 |
| WO | WO-2018/204541 A1 | 11/2018 |
| WO | WO-2018/223125 A1 | 12/2018 |

(56) References Cited

FOREIGN PATENT DOCUMENTS

WO     WO-2019/009913 A1     1/2019
WO     WO-2019/009914 A1     1/2019

OTHER PUBLICATIONS

Shakshuki—A Multi-Agent System Architecture for Information Gathering, 2000, IEEE, pp. 732-736 (Year: 2000).*
A White Paper from the Sovrin Foundation, "Sovrin: A Protocol and Token for Self-Sovereign Identity and Decentralized Trust", Version 1.0 Jan. 2018. 42 pages.

* cited by examiner

USER INFORMATION GATHERING AND DISTRIBUTION SYSTEM

CROSS-REFERENCE TO RELATED APPLICATIONS

This application claims priority to U.S. Provisional Patent Application No. 62/272,422 entitled "USER INFORMATION GATHERING AND DISTRIBUTION SYSTEM", filed Dec. 29, 2015, incorporated herein by reference in its entirety.

BACKGROUND

Individuals often have a plurality of information associated with the individual that is shared with a plurality of entities. The information may include basic information associated with the individual such as first name, last name, email address, phone number, birthday, home address and so on. The information may also include information confidential to the individual such as social security number, health information, credit information, insurance information and so on. Often, individuals store this information in a variety of places (e.g., financial institution, safe, government agency, etc.). Individuals may also be asked to provide pieces of this information to many different entities during a transaction. For example, when an individual is getting approved for a mortgage, buying a new car, or visiting the hospital, the individual may be asked to provide a variety of information. However, the individual may not know what information is needed, or the individual may not have the information needed readily available. If the individual does not know what information is needed for certain transactions, the individual may provide too much or too little information to the entity. Providing too much information to an entity may be dangerous for the individual as the information may be used fraudulently by the entity or be available to others whom may use the information fraudulently.

SUMMARY

One embodiment of the invention relates to a method of alerting a user of user information to be sent to an entity during a transaction, the method being performed by a user information service (UIS) computing system associated with an information service. The method includes populating, by a UIS information circuit and an associated user database, an account with user information received from at least one of the user and a plurality of entities. The method further includes receiving, by the UIS information circuit over a network via a network interface circuit, a user information request relating to a transaction from an entity computing system associated with the entity. The method includes sending, by a security circuit of the UIS information circuit, an alert including an approval request to a user computing device associated with the user over the network, wherein the approval request contains an identification of user information requested in the user information request. The method further includes receiving, by the security circuit, an approval of the approval request from the user computing device. The method includes providing, by the UIS information circuit and the user information database, the approved information to the entity to complete the transaction.

Another embodiment relates to a method of alerting a user of missing information relevant to a transaction, the method being performed by a user information service (UIS) computing system associated with an information service to be sent to an entity. The method includes populating, by a UIS information circuit and an associated user information database, an account with user information received from at least one of the user and a plurality of entities. The method further includes receiving, by the UIS information circuit over a network via a network interface circuit, a potential transaction from a user computing device associated with the user, wherein the potential transaction includes transaction type and an indication of corresponding approved user information. The method includes providing, by the UIS information circuit, an alert to the user computing device relating to missing user information needed for the potential transaction that is not available in the user account after comparing information needed for the potential transaction to a plurality of similar transactions stored in a transaction type database. The method further includes receiving, by the UIS information circuit, user input from the user computing device providing missing user information and indicating the entity where the potential transaction will occur. The method includes providing, by the UIS information circuit, approved user information to the entity.

Yet another embodiment of the invention relates to a user information service (UIS) computing device. The device includes a network interface circuit configured to communicate with a user computing device associated with a user and an entity computing system. The method further includes at least one processor operatively coupled to a non-transient memory to form a UIS information circuit. The circuit is structured to populate, in a user information database, an account with user information. The circuit is further structured to receive, via a network interface circuit, a user information request from an entity computing system over a network. The circuit is structured to send, via a security circuit, an alert including an approval request indicating the user information requested in the user information request to the user computing device over the network. The circuit is further structured to receive a response to the approval request from the user computing device. The circuit is structured to provide user information corresponding to the user information request and the response to the approval request to the entity computing system.

DETAILED DESCRIPTION

Referring to the figures generally, user information gathering and distribution systems and methods are described.

The user information systems and methods are structured to receive a plurality of user information types (e.g., social security number, insurance information, etc.) associated with a user and to enable the user to manage and distribute the information in a secure, convenient, efficient, and time-saving manner. The user information system may be accessed with at least one user device (e.g., a mobile device, a smart watch, etc.). In some arrangements, the user information system is structured to receive an information request from an entity (e.g., bank, car dealer, etc.) based on a transaction type (e.g., mortgage approval, buying a car, etc.), compare the information request to information requests from similar entities for similar transactions, and to provide the user information to the entity. The user information functions allow the user to add, manage, and distribute the user information. The user information system also predicts and verifies the user information needed for a given transaction to protect the user from risks of giving too much or incorrect information to an entity.

Figure 1:
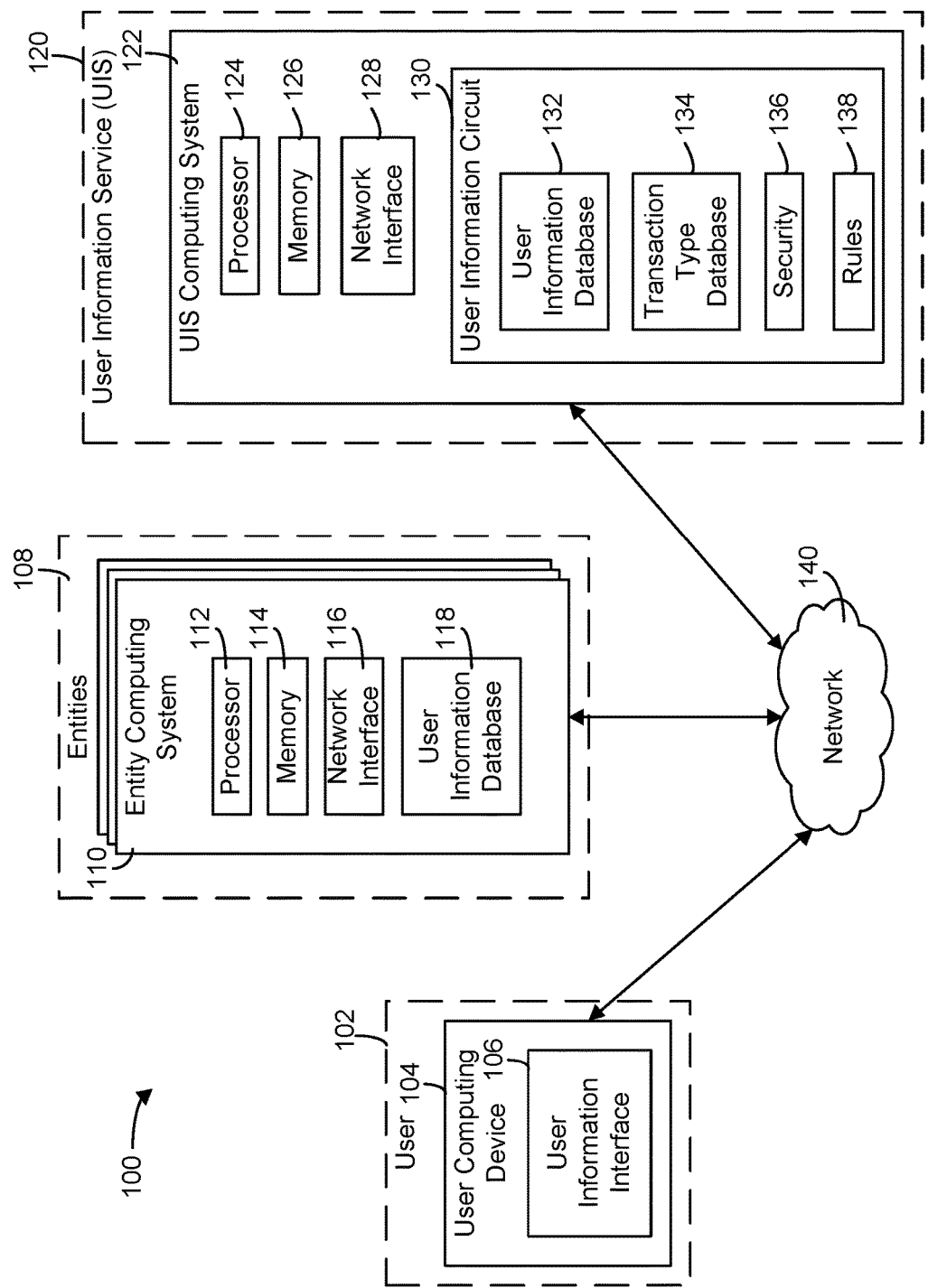
FIG. 1 is a diagram of a data exchanging system, according to an example embodiment.

Referring now to FIG. 1, a diagram of a data exchange system 100 is shown according to an example embodiment. The computing system 100 includes a user 102, a plurality of entities 108, a user information service 120, and a network 140. The network 140 may include any of various types of data exchanging networks. For example, the network 140 may include wireless networks (e.g., 802.11X, ZigBee™, Bluetooth™, Internet, etc.), wired networks (e.g., Ethernet), or any combination thereof. The network 140 is structured to permit the exchange of data, values, instructions, messages, etc. between and among the user computing device 104, the entity computing system 110, and the user information service computing system 122.

The user 102 may include individuals, business representatives, large and small business owners, other entities, and so on. The user 102 is associated with a user computing device 104. The user computing device 104 may be, but is not limited to, a mobile computing device (e.g., a smartphone, tablet computer, laptop computer, person digital assistant, etc.), a desktop computing device, a wearable computing device, etc. Wearable computing devices refer to any type of computing device that a user 102 wears including, but not limited to, a watch, glasses, bracelet, etc.

The user computing device 104 includes a user information circuit 106. The user information circuit 106 is structured to allow the user 102 to communicate with the user information service 120. For example, the user information circuit 106 may be structured to provide a user interface (e.g., a graphical user interface) that permits the user 102 to provide information (e.g., user information) that is communicated to a user information service computing system 122 associated with the user information service 120. In this regard, the user information circuit 106 may be communicably coupled to a processor, non-transient memory, and network interface enabling the user computing device 104 to exchange data over the network 140.

In addition, the user information circuit 106 communicates data to and from the user information service computing system 122 via network 140. In some arrangements, the user 102 may download a user information application (e.g., a software "app") prior to use, which may be used to set up and configure the user information circuit 106. In another arrangement, the user information circuit 106 is hard coded into the memory of the user computing device 104. In further arrangements, the user information circuit 106 is a web-based interface application accessed via the Internet on a web browser executed on the user computing device 104. In such arrangements, the user information circuit 106 is executed and maintained remotely (e.g., on the user information service computing system 110). In this instance, the user 102 logs onto or accesses the web-based interface to access the user information circuit 106. In some arrangements, the user information circuit 106 is supported by a separate computing system comprising one or more servers, processors, network interface circuits, etc. that transmit the applications for use to the user computing device 104. In certain embodiments, the user information circuit 106 may include an application programming interface (API) and/or a software development kit (SDK) that facilitates the integration of other applications with the user information circuit 106.

Each of the entities 108 provide services to a plurality of users, including the user 102. Examples of the entities 108 include financial institutions, merchants, insurance companies, utility companies, social media networks, e-mail systems, health care providers, etc. Each of the plurality of entities 108 operates and/or is associated with a respective entity computing system 110. Each entity computing system 110 includes a processor 112, memory 114, a network interface circuit 116 and a user information database 118. The network interface circuit 116 facilitates the sending and receiving of data, commands, instructions, values, etc. over the network 140 (e.g., to and from the user information service computing system 120, etc.). Each entity computing system 110 is communicably coupled to the user information service computing system 122 and/or the user computing device 104 via the network 140.

The entity computing system 110 also includes a user information database 118 that stores user information relating to the user 102. The entity computing system 110 may maintain information about one or more of the entities 108, information regarding user 102 (e.g., accounts associated with the user 102 and a respective one of the entities 108, etc.) and so on in the user information database 118. In this regard and as mentioned above, more than one entity 108 with an associated entity computing system 110 may be communicably coupled to the components of FIG. 1 over the network 140 to accommodate user information associated the user 102 at a plurality of entities 108. For example, if the entity 108 is a financial institution, the user information database may store user account information including account numbers, balances, credit limits, and so on.

In some arrangements, the user information service 120 is affiliated with a given entity 108 (e.g., a financial institution). In other arrangements, the user information service 120 is not directly affiliated with a given entity 108. The user information service 120 includes a user information service computing system 122. The user information service computing system 120 includes a processor 124, memory 126, a network interface circuit 128, and a user information service ("UIS") information circuit 130. The network interface circuit 128 facilitates the sending and receiving of data, commands, instructions, values, etc. over the network 140 (e.g., to and from the user computing device 104, to and from the entity computing system 110, etc.). The user information service computing system 122 is structured to provide storage of user information associated with the user 102 and distribution of user information associated with the user 102 to one or more of the entities 108.

The UIS information circuit 130 of the user information service computing system 122 provides storage and distribution of user information to the user 102 via the user information circuit 106. The operation of the user information service computing system 122 and the UIS information circuit 130 are described in further detail with respect to FIGS. 2 through 7.

Figure 2:
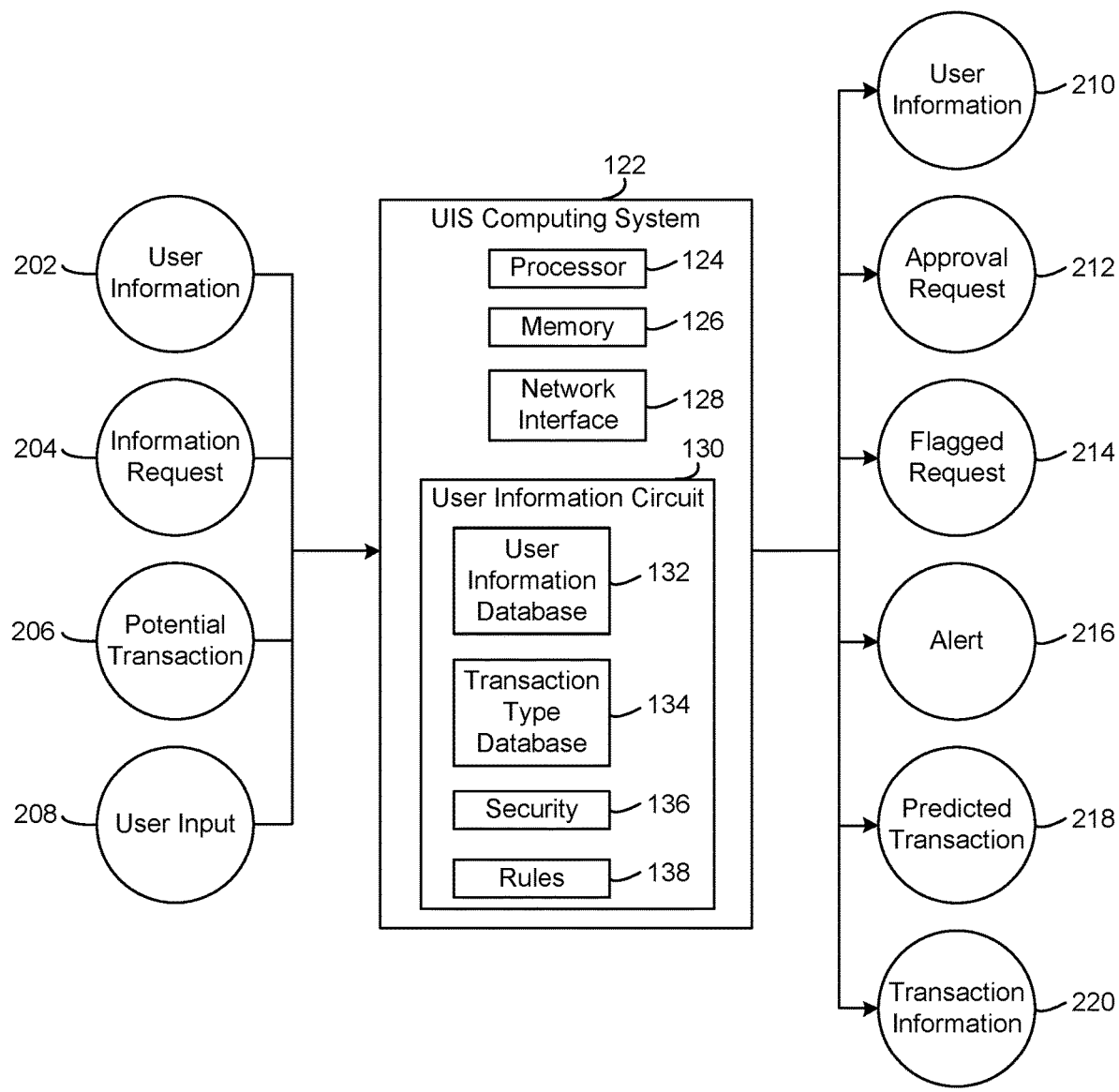
FIG. 2 is a diagram of information and data flows of the data exchanging system of FIG. 1, according to an example embodiment.

Now referring to FIG. 2, a diagram of information and data flows to and from the user information service computing system 122 of FIG. 1 is shown in greater detail, according to an example embodiment. The UIS information circuit 130 at the user information service computing system 122 communicates data to and from the user information circuit 106 and the entity computing system 110 via the network 140, and includes a user information database 132, a transaction type database 134, a security circuit 136, and a prediction circuit 138. The user information database 132 includes storage media or access thereto structured to retrievably store user information flowing into the UIS computing system 122. The transaction type database 134 retrievably stores information relating to a plurality of different transaction types, including types of user information relevant to each of the plurality of different transaction types. In some arrangements, the information in the user information database 132 is shared with the transaction type database 134. The security circuit 136 is structured to maintain and apply various security protocols relating to information stored in the user information database 132, as well as information requested from the user 102. The prediction circuit 138 is structured to predict future transactions based on information flowing to the UIS computing system 122 (e.g., information from the user information circuit 106) and information stored at the user information database 132 and the transaction type database 134. Various example operations of the UIS information circuit are discussed in more detail below.

The user information service computing system 122 receives a plurality of inputs, including, but not limited to, incoming user information 202, information request 204, potential transaction 206, user input 208 from at least the user information circuit 106 and the entity computing system 110.

Incoming user information 202 may be any type of information relating to the user 102. For example, the incoming user information 202 may be personal information (e.g., social security number, birthday, home address, name, etc.), financial information (e.g., credit score, bank account balances, etc.), health information (e.g., allergies, vaccinations, family medical history, etc.) and so on. The incoming user information 202 may be received by the user information service computing system 122 from the user computing device 104. Alternatively, the incoming user information 202 may be received from the entity computing system 110. For example, the user information computing system 122 may receive health care information (incoming user information 202) associated with the user 102 from a computing system associated with a health care provider.

Information request 204 may be a request from the entity computing system 110 for user information associated with the user 102 sent to the user information service computing system 122. The information request 204 may include a list of specific user information that is being requested. The information request 204 may also include the entity 108 that is requesting the user information. In addition, the information request 204 may indicate a type of transaction for which the entity computing system 110 is requesting the user information.

Potential transaction 206 is a transaction, indicated by the user 102 via the user information circuit 106, that the user 102 may complete in the future. For example, if the user 102 is planning on purchasing a car, but not for a few months the user 102 may send the user information service computing system 122 a potential transaction 206. In this case, the user 102 may want to plan ahead to gather additional user information that may be needed for the potential transaction 206. The potential transaction 206 is received by the user information service computing system 122 from the user information circuit 106.

User input 208 refers to input received from the user 102 at the user information circuit 106. The user input 208 may include user responses to approval request 212, flagged request 214, alert 216, and/or predicted transaction 218, discussed below. In some arrangements, user input 208 also includes setting and preferences associated with a user account for the user 102 with the user information service 120.

The UIS information circuit 130 at the user information service computing system 122 is also structured to provide information, requests, and alerts 216 to the entity computing system 110 and the user information circuit 106. An alert 216 is a notification to be received at the user computing device 104, and may specify a type of pending request, an requested response from the user 102, a notification, and so on. The user information circuit 106 may receive the alert 216 over the network 140 and use any of a variety of output devices at the user computing device 104 to bring the alert 216 to the attention of the user 102. The alert 216 may be associated with any of the outgoing types of data from the UIS computing system 122 (e.g., an approval request 212, a flagged request 214, a predicted transaction 218, etc.). The alert 216 may be sent via email, text message, push notification, etc. The user 102 may set up and configure alerts 216 and alert preferences when setting up the user account.

The user information service computing system 122 may provide outgoing user information 210 to one or more of the plurality of entities 108. Outgoing user information 210 may be substantially similar to incoming user information 202 in that outgoing user information 210 may include any of various types of information relating to a given user. However, outgoing user information 210 is a set of user information that will be provided to the entity computing system 110. For example, in one arrangement, while the user information collectively received by the user information service computing system 122 includes all the user information types described above, the outgoing user information 210 sent to the entity computing system 110 may only include name, address, and credit score.

The security circuit 136 may provide an approval request 212 and a corresponding alert 216 to the user information circuit 106 to notify the user 102 of information relating to an information request 204 received from one or more of the plurality of entities 108. As another example, the security circuit 136 may provide the user information circuit 106 with all the user information that was requested in the information request 204, as well as information relating to the type of transaction for which the user information is being requested, and the entity 108 that is requesting the user information in the approval request 212. The security circuit 136 may receive, from the user 102 via the user information circuit 106, user input 208 indicating an approval of the user information of approval request 212.

A flagged request 214 and a corresponding alert 216 may be provided to the user information circuit 106 by the security circuit 136 to notify the user 102 of information relating to an information request 204 received from one or more of the plurality of entities 108 when a piece of user information requested is unusual (e.g., medical information requested when getting a car loan).

The prediction circuit 138 is structured to predict a potential future transaction the user 102 may be making based on activity by the user 102 on the user computing device 104. When the prediction circuit 138 identifies a potential future transaction, the prediction circuit may provide a predicted transaction 218 and a corresponding alert 216 to the user information circuit 106, which in turn may provide the predicted transaction 218 to the UIS information circuit 130.

The UIS information circuit 130 may provide transaction information 220 to the user information circuit 106 from the transaction type database 134 to inform the user 102 about a transaction that is presently occurring or is actually set to occur.

In operation, the incoming user information 202 may be transmitted to the user information service computing system 122 via the user information circuit 106 of the user computing device 104. The first time the user 102 sends incoming user information 202 to the user information service computing system 122, the UIS information circuit 130 may treat the incoming user information 202 as a request to create an account with the user information service 120. The user account contains incoming user information 202 received from the user 102, and all of the incoming user information 202 may be stored in user information database 132. The user information database 132 is configured to store and manage incoming user information 202 associated with user 102 at the user information service computing system 122. The UIS information circuit 130 may also receive incoming user information 202 from one or more entities 108 associated with user 102 (e.g., social media, health care provider, etc.). In addition to storing and managing incoming user information 202, the user information database 132 maintains user account settings and preferences.

In operation, the information request 204 is transmitted to the user information computing system 122 from the entity computing system 110. The information request 204 may specify the entity 108 requesting the user information, the type of transaction occurring, and the user information being requested. As used herein, the term "transaction" may refer to financial and non-financial transactions. An example of a non-financial transaction may be providing outgoing user information 210 to an entity. Accordingly, the term "transaction" may refer to any operation or interaction executed by the user 102 with an entity 108 (e.g., visiting the doctor, making a flight reservation using frequent flier miles, financial transactions, buying a car, getting approved for a loan, etc.).

The UIS information circuit 130 may compare the information request 204 to other requests of similar transaction types using the transaction type database 134. Information relating to different types of transactions and user information commonly requested for these types of transactions is stored in transaction type database 134. The transaction type database 134 may be constantly updating the outgoing user information 210 requested for certain transactions. In this regard, the transaction type database 134 may be dynamic and adaptive to learn what user information is commonly requested for a transaction. The transaction type database 134 may be updated manually by personnel (e.g., employees, etc.) associated with the user information service 120, or may use prior transactions of all users with accounts at the user information service 120, including user 102.

The security circuit 136 is structured to determine if information requested by the entity is consistent with information normally requested by a similar entity for a similar transaction type. The security circuit 136 may also be structured to flag inconsistent information and send the user 102 a flagged request 214 and a corresponding alert 216. When the UIS information circuit 130 compares the information request 204 to similar information requests of the same or similar type that are maintained in the transaction type database 134, user information that is requested in information request 204 that is not consistent with information requests of the same or similar type may be flagged by the security circuit 136. The security circuit 136 may have different levels or criteria for flagging requested user information. The flagging levels may be preset or determined by the user 102 when the user account is created. The flagging levels may also be based on more than one type of criteria (e.g., frequency of request, level of security of information, etc.). The security circuit 136 is also structured to determine the level of security for each piece of information the user 102 provides, and maintain security protocol for sharing information with a certain security level. For example, the security circuit 136 may require the user 102 to provide a password before the UIS information circuit 130 can share the social security number of the user 102 with one of the entities 108.

The UIS information circuit 130 may provide the user 102 with an alert 216 via the user information circuit 106 when certain user information is requested. The UIS information circuit 130 may provide the user 102 with alert 216 via the user information circuit 106 when user information is requested that the user 102 does not have linked or stored in the user information database 132. Alert 216 may also be provided to the user 102 via the user information circuit 106 to remind the user 102 to provide the user information service computing system 122 with user information that will be needed for a future transaction the user 102 has indicated (e.g., potential transaction 206).

The UIS information circuit 130 may receive a potential transaction 206 generated and transmitted from the user information circuit 106. The user 102 may be planning on completing a transaction (e.g., getting a loan, qualifying for a mortgage, buying a car, etc.) and use the user information circuit 106 to transmit a corresponding potential transaction 206 to the user information service computing system 122. The UIS information circuit 130 may search the transaction type database 134 to determine the user information that may be needed to complete the potential transaction 206. In view of the information returned from the transaction type database 134, the user 102 may have time to gather additional user information that is needed and check to see if the user information is accurate before completing a transaction with any one or more entity 108. Alternatively, the UIS information circuit 130 may receive the potential transaction 206 from entity computing system 110. The user 102 may visit one or more of the entities 108 looking for information regarding a transaction. In this regard, the entity computing system 110 may send a potential transaction 206 to the user information service computing system 122 indicating that user 102 may complete a transaction with entity 108. The entity computing system 110 may also indicate what user information would be needed to complete the transaction. Again, the user 102 would have time to gather additional user information that may be needed and check to see if the user information is accurate before completing a transaction with entity 108.

The UIS information circuit 130 may cooperate with the prediction circuit 138 to provide predicted transactions 218 to the user 102. A predicted transaction 218 is information relating to an anticipated transaction based on the past behavior of the user 102. The user information service computing system 122 may monitor other applications on the user computing device 104 and/or monitor website activity on the user computing device 104 to predict a potential transaction 218 of the user 102. The prediction circuit 138 may be set with different transactions that could be completed and information that may be indicative of the transaction. For example, if the user 102 is looking up homes or properties, the prediction circuit 138 may predict the user 102 will be purchasing a home. The UIS information circuit 130 may notify (e.g., via alert 216) the user 102 of the predicted transaction 218 via the user information circuit 106. The user 102 may transmit user input 208 to the user information service computing system 122 indicating if the predicted transaction 218 is accurate. The UIS information circuit 130 may use the transaction type database 134 to provide the user 102 with outgoing user information 210 corresponding to user information that would likely be needed for the predicted transaction 218.

When the user 102 is ready to complete a transaction (e.g., send outgoing user information 210) with one or more of the entities 108, the user 102 may provide user input 208 to the user information service computing system 122 via the user information circuit 106. Where the user input 208 is an approval, the approval may include each piece of user information that is approved by user 102 to be sent to the entity computing system 110. The security circuit 136 may require the user 102 to provide authorization with the user input 208 indicating an approval. In some embodiments, the security circuit 136 may also require the entity 108 (e.g., an employee associated with entity 108) to provide authorization or authentication before outgoing user information 210 is provided. For example, the entity 108 may have to provide the security circuit 136 with a password (e.g., phrase, number, alphanumeric sequence, etc.), a biometric (e.g., fingerprint, retina, etc.), etc. Alternatively, the user input 208 may include a selection of one or more entity 108 when the user 102 has already approved all the outgoing user information 210 to be sent to one or more entity 108 (e.g., potential transaction 206, predicted transaction 218, etc.). The user information service computing system 122 transmits the approved outgoing user information 210 to entity computing system 110.

Figure 3:
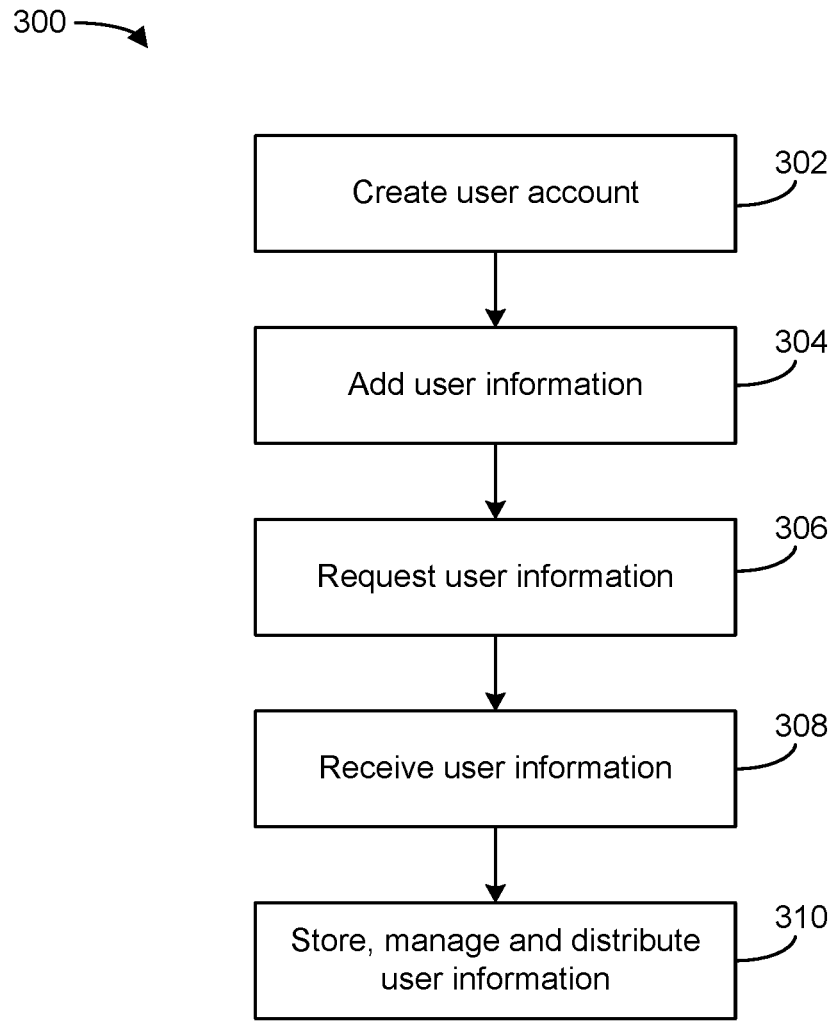
FIG. 3 is a flow diagram of a method of populating user information for a user account, according to an example embodiment.

Now referring to FIG. 3, a flow diagram of a method 300 of populating user information for a user account with the user information service computing system 122 is shown, according to an example embodiment. The method 300 registers the user 102 with the user information service 120 and gathers user information associated with the user 102.

A user account is created at 302. The user account created may be initiated by user 102 transmitting incoming user information 202 to the user information service computing system 122 via the user information circuit 106. The user 102 may provide additional information that is optional for the user 102 to include for registration. For example, the user 102 may have the option to add a phone number, set preferences for the user account, and change the password associated with the user account. The user account may also include system preferences the user 102 defines. The system preferences may include security preferences, usage preferences, alert preferences, and so on. The security preference may define the requirements needed by the security circuit 136 before accessing the user information service computing system 122 via the user information circuit 106. For example, a security preference may require the user 102 to provide a password (e.g., word, phrase, alphanumeric value, etc.), a biometric scan (e.g., a fingerprint scan, a retina scan, a voice sample, etc.), a semi-random number (e.g., as generated by a changing security token device), or a combination thereof to the security circuit 136 before the user 102 may access the user information service computing system 122. The security circuit 136 may also allow the user 102 to define user information (e.g., social security number, etc.) that require a second passcode to authorize transmission to entity computing system 110. Alert preferences may include when alert 216 is sent to the user information circuit 106 (e.g., information request 204 received, social security number requested, etc.), a form of alert 216 (e.g., text message, email, notification, etc.) and information included in alert 216 (e.g., user information requested, transaction type, entity 108 requesting the information, etc.).

Incoming user information 202 is added to the user account by the UIS information circuit 130 at 304. The user 102 may manually enter the user information via input devices associated with the user computing device 104. In some arrangements, the user information circuit 106 provides a graphical user interface with labeled spaces for the user 102 to enter specified information. For example, the user 102 may fill in the home address of user 102 in a box labeled "Home Address." The user 102 may also include information about one or more of the entities 108 that may provide additional incoming user information 202. For example, the user 102 may provide information regarding a health care provider or financial institution associated with the user 102 to the user information service computing system 122 via the user information circuit. Alternatively, the user 102 may link the user information circuit 106 to other applications used by the user 102 that include user information (e.g., mobile banking application, social media application, etc.).

The user information service computing system 122 may request user information from the entity computing system 110, at 306. For example, the UIS information circuit 130 may request healthcare information associated with user 102 from the health care provider indicated by the user 102 at 304. Additionally, the user information service computing system 122 may request user information from the user 102 via the user information circuit 106. If the UIS information circuit 130 has a set of user information (e.g., name, email, phone number, address, etc.) that is required for all users, including user 102, the UIS information circuit 130 may send alert 216 to the user 102 via the user information circuit 106 indicating that user information is missing and/or incomplete.

The UIS information circuit 130 of the user information service computing system 122 receives incoming user information 202 at 308. The incoming user information 202 received at 308 may be the user information requested at 306, or additional information provided to the UIS information circuit 130 via the user information circuit 106 or the entity computing system 110. If the information requested is information that remains constant (e.g., social security number, birthday, etc.), or relatively constant (e.g., home address, last name, insurance information, healthcare information, etc.), the user information database 132 may receive a copy of the user information. Alternatively, if the user information changes frequently (e.g., balance of financial accounts, credit score, etc.) the UIS information circuit 130 may receive access to the user information instead of receiving copy of the user information. The incoming user information 202 received at 308 may be compared to the user information currently associated with the user account and/or other incoming user information 202 being received by the user information database 132. The UIS information circuit 130 may send the alert 216 to the user 102 via the user information circuit 106 when a discrepancy is determined between pieces of user information. For example, if the home address associated with the user 102 received from one entity 108 is listed as "Pin Oak" and the home addressed associated with the user 102 at a different entity 108 is listed as "Pine Oak," the user 102 may send user input 208 to the user information service computing system 122 indicating the information that is correct and should be stored in the user information database 132. In some embodiments, the user information service computing system 122 may ask the user 102 via alert 216 to the user information circuit 106 to verify the user information received from the various entity computing systems 110 even if no discrepancies are found for the piece of user information.

The UIS information circuit 130 of the user information service computing system 122 stores, manages, and distributes the user information at 310. The user information that is constant or relatively constant may be stored by the user information computing system 122. However, the user information may still be modified by user 102 via the user information circuit 106, but may require manual updating of the user information. User information that is relatively fluid, or changes frequently, may be managed by the user information database 132. This information may be updated frequently as entities 108 associated with the user information (e.g., a financial institution associated with a financial account of user 102) update the user information. Additionally, some user information may be managed on a set cycle or by user input. For example, the user 102 may indicate that the user 102 visits the eye doctor once a year, generally in March. The user information service computing system 122 may only request updated user information relating to the eye doctor (e.g., vision prescription, etc.) at the end of March, or may periodically check for user information updates during the month of March. If the user 102 instead visits the eye doctor in February, the user 102 may indicate via the user information circuit 106, that the user information associated with the eye doctor has been updated. The user information service computing system 122 may request user information from a computing system (e.g., entity computing system 110) associated with the eye doctor (e.g., entity 108) based on the user input 208 indication received from user information circuit 106. User information may then be selectively distributed to entity computing system 110 by the user information service computing system 122. Additional methods for managing and distributing user information are explained in further detail below with respect to FIGS. 4-7.

Figure 4:
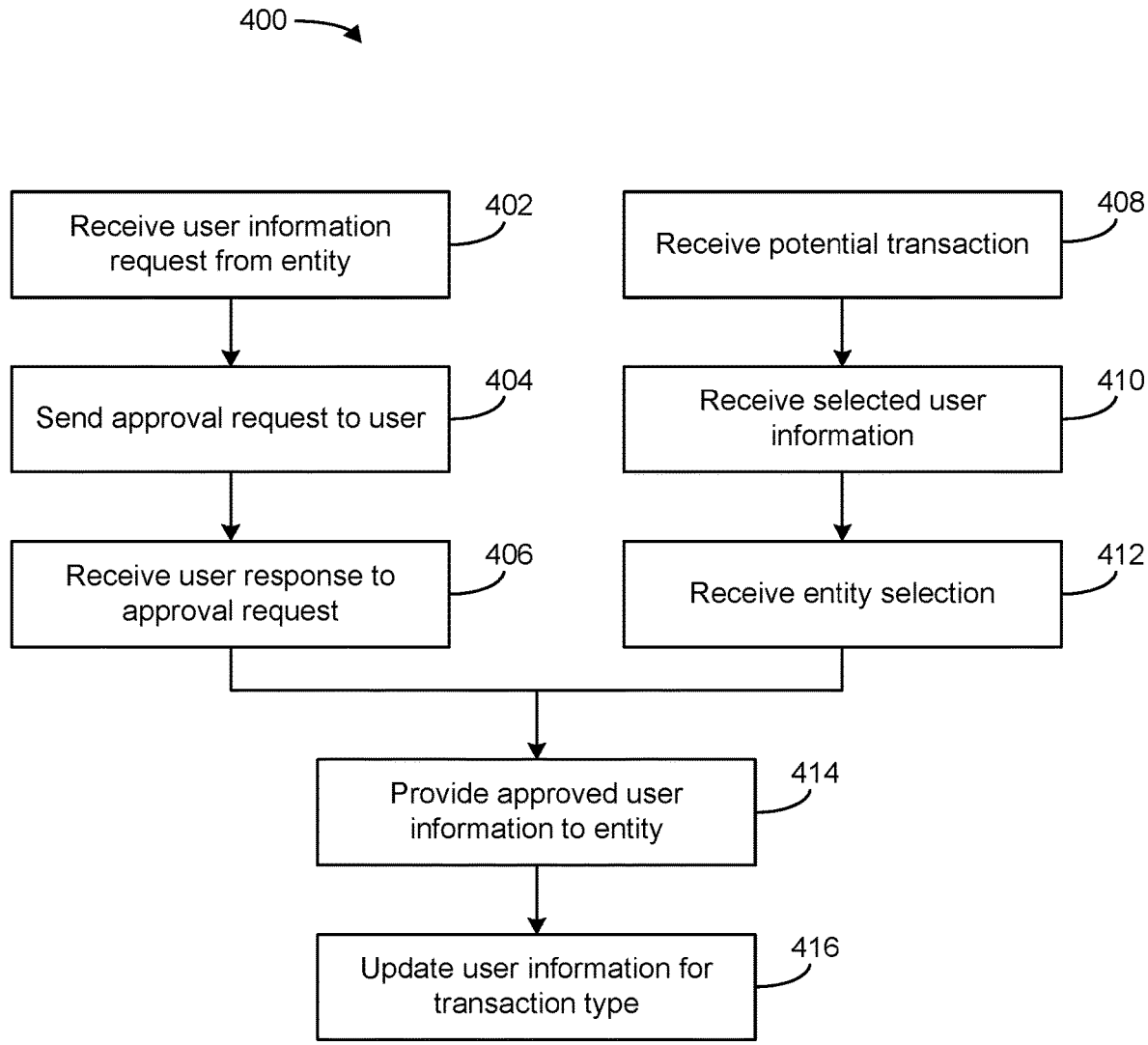
FIG. 4 is a flow diagram of a method of providing user information to an entity, according to an example embodiment.

Referring now to FIG. 4, a flow diagram of a method 400 of providing user information to an entity using the user information service computing system 122 is shown, according to an example embodiment. The method 400 provides user information to computing system 122 based on a transaction occurring between the user 102 and one or more of the entities 108. The method 400 may be initiated in two ways, by the user 102, or by one or more of the entities 108.

The user information service computing system 122 receives an information request 204 from the entity computing system 110 at 402. The information request 204 may include a list of all the user information (e.g., name, address, credit score, financial institution, etc.) being requested for the user 102 by the entity 108 for a transaction. The information request 204 may also include the type of transaction that is taking place (e.g., mortgage approval, etc.) and/or information relating to the entity 108. The entity 108 may have to register (e.g., create an entity account, etc.) with the user information service computing system 122 before the information request 204 can be received from the entity computing system 110. Alternatively, the entity 108 may not have to register with the user information service before the user information service computing system 122 can receive an information request 204 from the entity computing system 110.

The entity computing system 110 may have to provide at least basic user information (e.g., first and last name, phone number, etc.) to the user information service computing system 122 to identify the account associated with the user 102 at the user information service 120. In some embodiments, the security circuit 136 may require the entity computing system 110 to provide a form of authentication to ensure the entity computing system 110 is not trying to obtain user information for fraudulent purposes. For example, the entity 108 may have to register an entity account and provide a password (e.g., phrase, number, alphanumeric sequence, etc.), a biometric (e.g., fingerprint, retina, etc.), etc. to the security circuit 136 before the user information service computing system 122 responds to the information request 204.

The entity 108 may have an entity number to associate the entity 108 with the user information service computing system 122. The entity number may be associated with a user information service 120 account held by the user information service computing system 122 for the entity 108. The entity account may contain information relating to transactions common for the entity 108 stored in the transaction type database 134. For example, a car dealership may have car loan and car purchase transactions associated with the entity account stored in the transaction type database 134. The transaction type database 134 may also contain information commonly requested for the transactions associated with the entity 108. The user information service computing system 122 can use this information to determine if the entity computing system 108 is requesting information consistent with information requests 204 made in the past. For example, if the car dealership has a defined set of user information that is requested from the user 102 when the user 102 is getting a car loan, but an information request 204 contains more information than normally requested, the security circuit 136 may suspect fraudulent activity relating to the entity computing system 110. Inconsistent user information requests will be described in greater detail with respect to FIG. 5.

The user information service computing system 122 may send an approval request 212 and a corresponding alert 216 to the user 102 via the security circuit 136 of the user information circuit 106 at 404. The approval request 212 may present the user information in a way that indicates the type of user information without revealing the user information. For example, the approval request 212 may indicate that the home address of user 102 was requested, without actually providing the home address of the user 102. Alternatively, the user 102 may be notified by the user information service computing system 122 via the user information circuit 106 of the approval request 212 and have to log in to the user information computing system 122 to see the approval request 212. For example, the user 102 may receive a notification saying "Someone has requested user information, please login to approve this request," etc. The approval request may also include information identifying the entity 108 that sent the information request 204. By identifying the entity 108, the user 102 can provide the correct outgoing user information 210 to the entity 108. The approval request 212 may also include the transaction information 220. For example, the approval request 212 sent be the user information service computing system 122 may indicate that the user information is being requested to complete a car loan. By providing the transaction information 202 to the user 102 via the user information circuit 106, the user 102 can verify the entity 108 requested the user information for the correct transaction. The approval request 212 may also indicate to the user 102 if any user information was requested that is not associated with the user information database 132.

The user information service computing system 122 receives a response to the approval request from the user 102 via user input 208 from the user information circuit 106 at 406. The response to the approval request indicates which user information has been approved by the user 102 to share with the entity 108 that sent information request 204. The user 102 may approve all, part or none of the user information in the user input 208. If the user 102 does not approve any of the user information sought in the user information request 204, the method 400 may terminate.

If the user 102 approves part or all of the user information, outgoing user information 210 is provided to the entity computing system 110 of the entity 108 that sent the information request 204 at 414. If the user 102 has multiple pieces of the same type of user information (e.g., multiple accounts, two home addresses, etc.) the response may indicate which user information is to be shared (e.g., checking account, one of the home addresses, etc.) with the entity computing system 110 for a given type of user information. Alternatively, the user 102 may choose to approve all pieces of the same type of user information with the user input 208. The user 102 may approve the user information by checking a box next to the user information using a graphical user interface associated with the user information circuit 106. The user 102 may have to provide authorization to the security circuit 136 in order to approve a piece of user information with high security. For example, if the user 102 is approving the social security number associated with the user 102, the user may have to provide authorization to the security circuit 136. For example, the user 102 may have to provide a password (e.g., phrase, number, alphanumeric sequence, etc.), a biometric (e.g., fingerprint, retina, etc.), etc. to the security circuit before the outgoing user information 210 is authorized to be sent to the entity computing system 110. In some embodiments, all user information requires authorization, while higher level security information requires secondary authorization from the security circuit 136. Other methods of selecting and approving information for approval are intended to fall within the scope of the present disclosure.

Instead of receiving an information request 204 from entity 108, the user information service computing system 122 may receive a potential transaction 206 from user 102 via the user information circuit 106 at 408. Alternatively, the user information service computing system 122 may receive the potential transaction from the entity computing system 110. The potential transaction 206 received from the entity computing system 110 by the user information service computing system 122 may contain information consistent with the information request 204 received at 402. However, in this case, the entity computing system 110 is not requesting any user information, the entity computing system 110 is simply providing the user information service computing system 122, and the user 102, with an indication of what user information would be requested.

The user information service computing system 122 receives selected user information from the user 102 via user input 208 from the user information circuit 106 at 410. If the potential transaction 206 was received by the user information service computing system 122 from the user information circuit 106, the transaction type database 134 may provide suggestions to the user 102 of what user information may be involved in the potential transaction 206. The user 102 can select relevant user information from the user information stored and managed by the user information database 132, or add additional user information relevant to the potential transaction. Alternatively, if the potential transaction was sent by the entity computing system 110, the user 102 may approve the user information, much like was done at 406. The selected user information may be stored in the user information database 132 so the user information is accessible when the user 102 is ready to complete a transaction.

When the user 102 is ready to complete the potential transaction 206, the user information service computing system 122 receives an entity selection at 412 from user input 208 from the user information circuit 106. Since the potential transaction 206 may have been initiated by the user 102 at 408, the entity 108 involved in the actual transaction may not be the entity 108 associated with the potential transaction 206. If the potential transaction was initiated by the entity computing system 110, the entity 108 may be saved in the user information database 132 with the user information for the potential transaction 206. The user 102 may choose if the entity 108 that initiated the transaction should be saved with the potential transaction 206 by proving user input 208 via the user information circuit 106. If the entity 108 was saved with the potential transaction 206, the user 102 can select entity 108 using the user information circuit 106. If no entity was saved with the potential transaction, the user 102 may select an entity to complete the potential transaction by providing user input 208 via the user information circuit 106. The user 102 may select an entity by providing the user information service computing system 122 with information about the entity (e.g., name, address, phone number, etc.) via the user information circuit 106. Alternatively, the user 102 may select an entity by using a drop down list of entities 108 associated with the user information service computing system 122 on a graphical user interface associated with the user information circuit 106. In another embodiment, the user 102 may enter an entity identification number associated with the entity 108 and the user information service computing system 122 via the graphical user interface associated with the user information circuit 106. The user 102 may receive the entity identification number from the entity 108, or from a list provided to the user 102 via the user information circuit 106 from the user information service computing system 122. Alternatively, the user 102 may use the user computing device 104 to scan a barcode, QR code, or other symbol at the entity 108 to indicate the entity 108 selected to the user information service computing system 122. A more detailed method with regard to potential transactions can be seen with reference to FIG. 6.

The user information service computing system 122 provides the approved outgoing user information 210 to the entity computing system 110 of the selected entity 108 at 414. The outgoing user information 210 may be provided to the entity computing system 110 in a number of ways. The user information service computing system 122 may provide the outgoing user information 210 in an email to the entity computing system 110 (e.g., in a PDF document, etc.). Alternatively, the user information service computing system 122 may populate a form associated with the entity computing system 110 to provide outgoing user information 210. In another embodiment, the user information service computing system 122 populates a database associated with the entity computing system 110 (e.g., user information database 118) to provide outgoing user information 210. In some embodiments, the entity 108 may determine how user information is sent based on setting associated with an entity account with the user information service 120. In other embodiments, the user information service computing system 122 determines how the outgoing user information 210 is sent to entity computing system 110. In another embodiment, the outgoing user information 210 is sent to the entity computing system 110 in different forms based on the level of security of the outgoing user information 210 determined by the security circuit 136.

The user information service computing system 122 updates the outgoing user information 210 for the transaction type at 416. The user information service computing system 122 may update the transaction type database 134. The transaction type database 134 may maintain all outgoing user information 210 requested for a plurality of transaction types. The transaction type database 134 may keep a single set of user information requested 210 for a given transaction type. Alternatively, the transaction type database 134 keeps all user information requested for a given transaction type for all users associated with the user information service computing system 122. In this regard, the transaction type database 134 may be adaptive and learn what user information is commonly requested for a given transaction type. This information may be used when determining if the information request 204 includes information not commonly requested, which will be described in greater detail with regard to FIG. 5.

Figure 5:
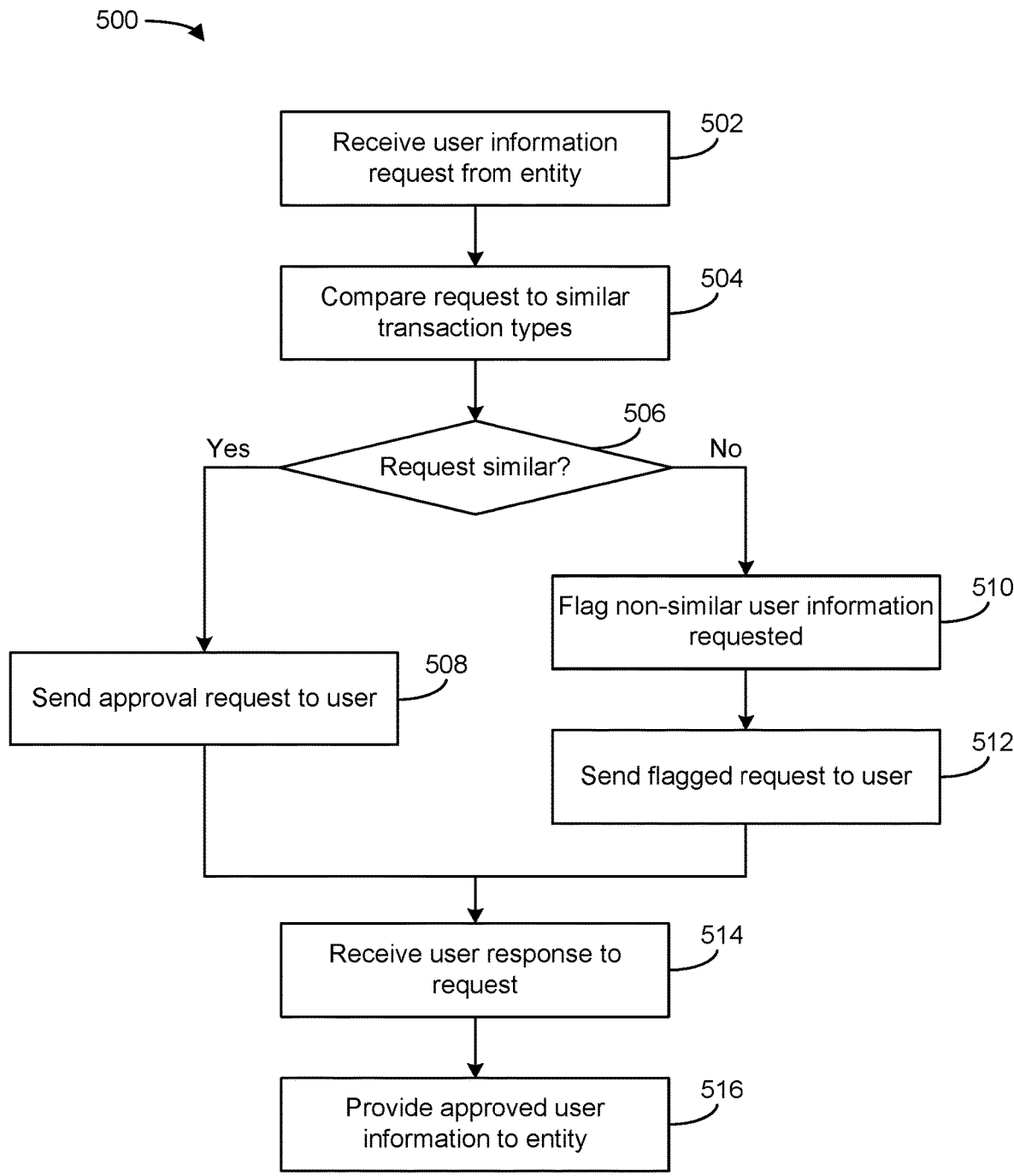
FIG. 5 is a flow diagram of a method of comparing a user information request from an entity, according to an example embodiment.

Referring now to FIG. 5, a flow diagram of a method 500 of comparing a user information request from an entity is shown, according to an example embodiment. The method 500 is performed by the user information service computing system 122. The method 500 receives an information request 204 from entity computing system 110 at 502, which may be substantially similar to process 402 of method 400, compares the information request 204 to user information requests for the same transaction type and provides the entity computing system 110 with the outgoing user information 210.

The user information service computing system 122 compares the information request 204 to user information requests of similar transaction types at 504. The information stored in the transaction type database 134 may also include the geographical location of the information request 204, in case different geographical locations (e.g., different states, etc.) have different protocols for user information requested for certain transactions. Additionally, the transaction type database 134 may determine trends in the user information requested based on the dates of the information requests 204. The user information service computing system 122 may compare the information request 204 received at 502 to individual user information requests stored in the transaction type database 134. Alternatively, the user information service computing system 122 may compare the information request 204 received at 502 to an information request 204 that is representative of all of the information requests 204 stored in the transaction type database 134.

The user information service computing system 122 determines if the information request 204 received at 502 is similar to other user information requests for similar transaction types at 506. The comparison may take into account the frequency of the user information requested. For example, if some type user information is always requested for the transaction type, and some type information is usually requested, these may both indicate a similar request and not cause the security circuit 136 to flag the information request 204. However, if a particular type of user information is rarely or never requested for the transaction type, but appears in the information request 204 received at 502, the information request 204 may not be considered similar. If the user information requested is similar to the user information frequently requested for the transaction type, approval request 212 and a corresponding alert 216 is sent to the user information circuit 106 at 508. Process 508 may be substantially similar to process 404 of method 400. If there are user information types that are not similar to the user information types frequently requested for the transaction type, processes 510-512 occurs.

The user information service computing system 122 flags non-similar user information types in the information request 204 at 510. The user information service computing system 122 may use the security circuit 136 to determine how to flag the user information that was determined inconsistent with frequently requested user information when compared with other user information requests for similar entity types using the transaction type database 134. The security circuit 136 may have different levels of comparison that would cause user information to be flagged. For example, if a piece of information is sometimes requested, a first flag may be applied (e.g., a yellow flag, etc.). If a piece of information is rarely requested, a second flag may be applied (e.g., an orange flag, etc.). If a piece of information is never, or should never, be requested a third flag may be applied (e.g., a red flag, etc.). Alternatively, the information may be flagged based on a level of security associated with the user information. For example, the name of user 102 may have a low security level and therefore have one flag associated with the name, while the social security number of the user 102 may have a high security level and therefore have a different flag associated with the social security number. In that regard, the user information requested that is inconsistent with the user information commonly requested may be flagged with a first, second, third, etc. flag based on the level of security of the user information. In some embodiments, a piece of user information may receive multiple sets of flags based on different criteria (e.g., frequency of request and level of security, etc.).

The user information service computing system 122 sends a flagged request 214 and a corresponding alert 216 to the user 102 via the user information circuit 106 at 512. The flagged request 214 indicates any information that was flagged by the security circuit 136 at 510. The flagged request 214 may also include information consistent with the approval request 212 of process 404 of method 400, such as transaction information 220 and information indicating the entity 108 that sent the information request 204, in addition to the flagged user information.

The user information service computing system 122 receives the user response to the request at 514 via user input 208 from the user information circuit 106 regardless of whether or not the information request 204 received at 502 was similar to information requests of similar transaction types. The user information service computing system 122 sends the approved outgoing user information 210 to the entity computing system 110 at 516. Process 514-516 may be substantially similar to processes 406 and 414 of method 400, respectively.

Figure 6:
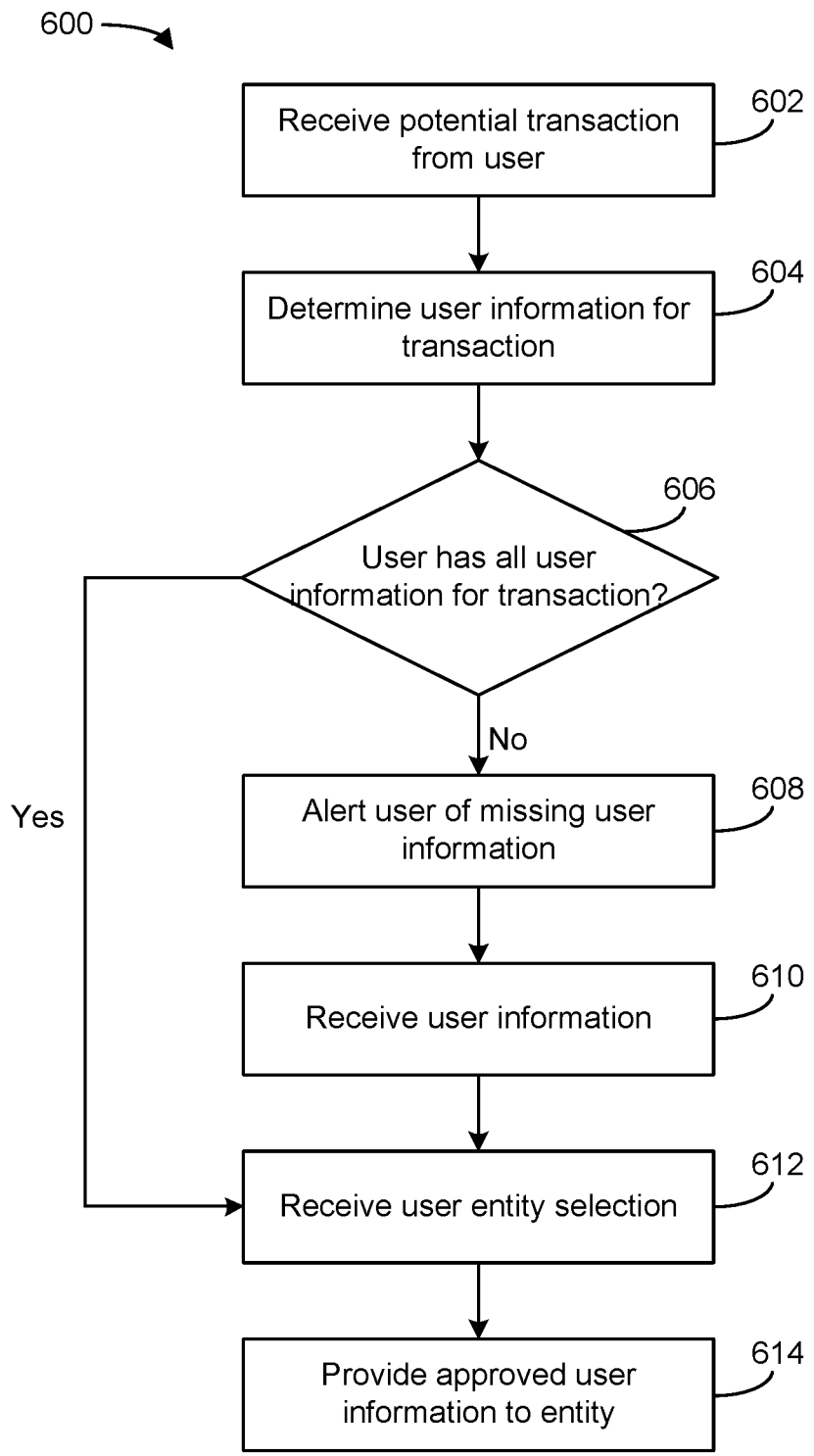
FIG. 6 is a flow diagram of a method of preparing user information for a predicted transaction, according to an example embodiment.

Referring now to FIG. 6, a flow diagram of a method 600 of preparing user information for a predicted transaction 218 is shown according to an example embodiment. The method 600 is performed by user information service computing system 122. The method 600 predicts a transaction based on activity of the user 102 and provides recommendation to the user 102 based on the predicted transaction 218.

The user information service computing system 122 predicts a transaction of the user 102 at 602. The user information service computing system 122 may monitor other software applications on the user computing device 104 and/or monitor website activity on the user computing device 104 to predict a potential transaction of the user 102. The prediction circuit 138 may be set with different transactions that could be completed and information that may be indicative of future transactions based on activity on the user computing device 104. For example, if the user 102 is looking up homes or properties, the prediction circuit 138 may predict the user 102 will be purchasing a home. The prediction circuit 138 of the user information service computing system 122 may be set to only predict a transaction after a given set of activity is monitored. For example, the user 102 may have to look at home and property listings multiple times in a given period of time before the prediction circuit 138 predicts the transaction to minimize the number of predicted transactions 218 generated.

The user information service computing system 122 sends the predicted transaction and a corresponding alert 216 to the user 102 via the user information circuit 106 at 604. The user information service computing system 122 may send the predicted transaction to the user information circuit 106 as an alert 216. The alert 216 may include the predicted transaction 218 as well as information indicating how the user information service computing system 122 predicted the transaction. For example, the alert may say "We noticed you have been viewing houses for sale frequently, are you planning on purchasing a home?" The user 102 may respond to the alert via user input 208 to the user information circuit 106.

The user information service computing system 122 determines if the user 102 confirmed the predicted transaction 218 or not at 606. If the user 102 indicates that the predicted transaction 218 is not a transaction the user 102 is planning on completing, the user information service computing system 122 may delete the predicted transaction 218 at 608. The prediction circuit 138 may also make note of the fact that the user 102 is not planning on making the predicted transaction 218 so as to minimize the chance of sending the user 102 another alert 216 relating to a predicted transaction 218 that is the same as a previously predicted transaction. If the user 102 confirms via user input 108 to the user information circuit 106 that the predicted transaction 218 is a transaction the user 102 plans on completing in the future, processes 610-614 may occur.

The user information service computing system 122 analyzes the user information at 610. Analyzing the user information may include determining the user information that is likely to be needed for a given transaction type by the transaction type database 134. The transaction type database 134 may determine different levels of user information. For example, the transaction type database 134 may determine user information that will most likely be needed for the identified transaction type. The transaction type database 134 may also determine user information that may be needed, depending on the entity 108 that the user 102 will be using to complete the transaction. The transaction type database 134 may use methods similar to those used when comparing the user information request to similar user information requests as described with respect to FIG. 5, specifically process 504 of the method 500. Analyzing the user information may also include comparing the user information needed for the transaction with the user information stored at the user information database 132. The user information service computing system 122 may compare the user information determined at 610 to the user information database 132 to determine if the user information database 132 has all the user information needed for the predicted transaction 218. Analyzing the user information may also include analyzing the content of the user information (e.g., financial information, etc.). Analyzing the content of the user information may provide the user information service computing system 122 with information regarding the likelihood of a successful transaction. For example, if the predicted transaction 218 is buying a car, but the user 102 does not have enough money saved for a down payment, analyzing the user information may indicate that the user 102 should be saving more money.

The user information service computing system 122 sends a predicted transaction recommendation and a corresponding alert 216 to the user 102 via the user information circuit 106 at 612. The predicted transaction recommendation is a recommendation to the user 102 based on the analysis of the user information at 610. The predicted transaction recommendation may include information relating to user information that is needed for the predicted transaction that the user 102 currently does not have associated with the user information service computing system 122. Alternatively, or in addition, the predicted transaction recommendation may provide the user 102 with information regarding improvements that could be made to the user information to increase the likelihood of a successful transaction. The user information service computing system 122 may provide the user 102 with the alert 216 via the user information circuit 106 indicating the predicted transaction recommendation. Alert 216 may also be provided to the user 102 via the user information circuit 106 by the user information database 132 to remind the user 102 to provide the user information service computing system 122 with user information that will be needed for the potential transaction if the user 102 has not provided the user information needed in a set amount of time. The predicted transaction recommendation may also include recommendations for changes in the activity of the user 102 in order to have a successful transaction when the user 102 is ready to complete the predicted transaction 218. For example, if the predicted transaction is buying a car, the predicted transaction recommendation may include financial recommendations to increase the likelihood that the user 102 will be able to make car payments, information on the credit score of the user 102 and how to improve the credit score to get better car loans, etc.

The user information service computing system 122 sets the predicted transaction as a potential transaction at 614. Since the user 102 has confirmed the predicted transaction is a transaction the user 102 is thinking about completing, the user information service computing system 122, it is no longer a predicted transaction.

Figure 7:
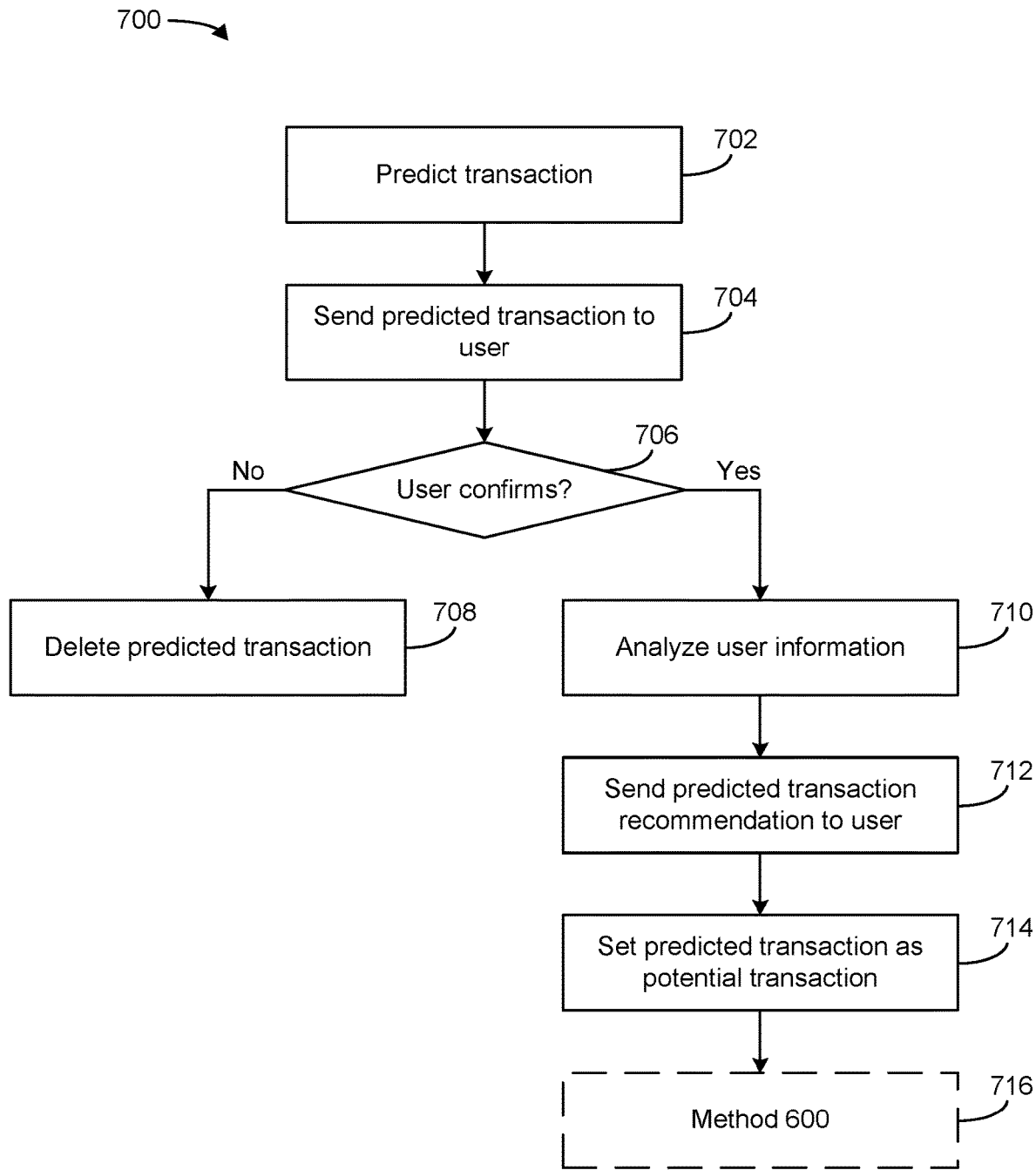
FIG. 7 is a flow diagram of a method of determining if a user has user information ready for a potential transaction, according to an example embodiment.

Referring now to FIG. 7, a flow diagram of a method 700 of determining if the user 102 has the user information ready for a potential transaction 206 is shown, according to an example embodiment. The method 700 is performed by the user information service computing system 122. The method 700 receives a potential transaction 206, determines if the user 102 has the user information that will likely be need for the potential transaction 206, and provides the entity computing system 110 with the approved outgoing user information 210. Alternatively, the potential transaction 206 is received as a product of method 600. Process 702 may be substantially similar to process 408 of method 400.

The user information service computing system 122 determines the user information needed for the transaction at 704, much like process 610 of method 600 when the transaction type database 134 analyzes the transaction type to determine the type of user information that will likely be needed for the potential transaction 206. However, unlike process 610 of method 600, the content of the user information is not analyzed to provide recommendations on changes in behavior.

The user information service computing system 122 determines if the user 102 has the user information determined at 704 for the potential transaction 206 received at 702 at 706. The transaction type database 134 may compare the user information determined at 704 to information in the user information database 132 to determine if the user information database 132 has the user information that will likely be needed for the potential transaction 206. If the user information that will likely be needed is in the user information database 132, the method 700 may proceed directly to process 712. If user information is needed and is not in the user information database 132, processes 708-710 occur.

The user information service computing system 122 alerts the user 102 of the missing user information at 708. The user information service computing system 122 may provide the user 102 with the alert 216 much like process 612. The alert 216 is received by the user 102 via the user information circuit 106 and indicates user information that was determined to be missing at 706.

The user information service computing system 122 receives incoming user information 202 at 710. The incoming user information 202 is received from the user 102 via the user information circuit 106 in response to the alert 216 notifying the user 102 of user information that is missing. Process 710 may be substantially similar to process 304 and 308 of method 300.

The user information service computing system 122 receives the user 102 entity selection at 712. The user 102 entity selection is sent from the user information circuit 106 and indicates which entity 108 the user 102 has selected to complete the potential transaction 206. Process 712 may be substantially similar to process 412 of method 400.

The user information service computing system 122 provides the approved outgoing user information 210 to the entity computing system 110 at 714. The entity computing system 110 that receives the approved outgoing user information 210 is the entity computing system 110 associated with the entity selected at 712. Process 714 may be substantially similar to process 414 of method 400.

By using the user information service to store and manage user information, individuals gain ease of access to user information. In addition, with all the user information stored in a single location, information is protected, accessible and easy to distribute. Oftentimes, when individuals are asked for user information, the individual must get the information from a variety of places. The individual may have some information stored at home in a safe, while other information is stored electronically. The individual may also have to reach out to other entities to get the information needed. This can be cumbersome for the individual, and cause delays in transactions the user would like to complete. In addition, once the individual obtains all the information, it has to be shared with the entity the individual is completing the transaction with. This process can be tedious and the individual may makes mistakes when providing large amount of information. By using the user information service, individuals can easily provide all the needed information to an entity to quickly, and accurately, complete a transaction.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of alerting a user of user information to be sent to an entity during an electronic transaction, the method being performed by a user information service (UIS) computing system associated with an information service, the method comprising:
    populating, by a UIS information circuit and an associated user information database, a user account with information received from at least one of the user and a plurality of entities;
    receiving, by the UIS information circuit over a network via a network interface circuit, a user information request relating to the electronic transaction from an entity computing system associated with the entity;
    comparing, by a security circuit of the UIS information circuit, the user information request to a plurality of similar user information requests in a transaction type database, wherein the plurality of similar user information requests are for a same type of transaction as the electronic transaction, and wherein the transaction type database is adaptive, constantly updates user information requested for certain types of transactions, and learns what user information requests to compare based on a given transaction type of prior user information requests;
    selectively flagging, by the security circuit, a type of user information requested in the user information request that is inconsistent with the user information requested in the plurality of similar user information requests based on a frequency of the type of user information requested in the plurality of similar user information requests, wherein corresponding flagged information of the user information request is included in an approval request, and wherein the type of user information is flagged based on a level of security of the type of user information, and selectively flagging the type of user information comprises applying a level of flag to the type of user information that corresponds to the frequency of the type of user information requested in the plurality of similar user information requests;
    sending, by the security circuit, an alert including the approval request to a user computing device associated with the user over the network, wherein the approval request contains an identification of the type of user information requested in the user information request without revealing the user information in the approval request;
    receiving, by the security circuit, an approval of the approval request from the user computing device; and providing, by the UIS information circuit and the user information database, the approved user information to the entity computing system to complete the electronic transaction.

2. The method of claim 1, wherein the approval includes at least one of a password, a biometric scan, and a semi-random number generated by a changing security token device.

3. The method of claim 1, wherein the approval varies based on the level of security associated with the type of user information by the security circuit, and wherein a type of user information with a higher level of security requires a secondary authorization from the user computing device.

4. The method of claim 1, further comprising determining, by the UIS information circuit, whether user information populated in the user information database includes any discrepancies, wherein the alert indicates any discrepancies and requests a correction of user information.

5. A user information service (UIS) computing device comprising:
   a network interface circuit configured to communicate with a user computing device associated with a user and an entity computing system associated with an entity; and
   at least one processor operatively coupled to a non-transient memory to form a UIS information circuit structured to:
      populate, via the UIS information circuit and an associated user information database, a user account with information received from at least one of the user and a plurality of entities;
      receive, via the UIS information circuit over a network via the network interface circuit, a user information request relating to an electronic transaction from the entity computing system over the network;
      compare, via a security circuit of the UIS information circuit, the user information request to a plurality of similar user information requests in a transaction type database, wherein the plurality of similar user information requests are for a same type of transaction as a transaction type of the electronic transaction, wherein the transaction type database is adaptive, constantly updates user information requested for certain types of transactions, and learns what user information requests to compare based on a given transaction type of prior user information requests;
      selectively flag, via the security circuit, a type of user information requested in the user information request that is inconsistent with the user information requested in the plurality of similar user information requests based on a frequency of the type of user information requested in the plurality of similar user information requests, wherein corresponding flagged information of the user information request is included in an approval request, and wherein the type of user information is flagged based on a level of security of the type of user information, and selectively flagging the type of user information comprises applying a level of flag to the type of user information that corresponds to the frequency of the type of user information requested in the plurality of similar user information requests;
      send, via the security circuit, an alert including the approval request to the user computing device associated with the user over the network, wherein the approval request contains an identification of the type of user information requested in the user information request without revealing the user information in the approval request;
      receive, via the security circuit, an approval of the approval request from the user computing device; and
      provide, via the UIS information circuit and the user information database, the approved user information to the entity computing system to complete the electronic transaction.

6. The device of claim 5, wherein the approval includes at least one of a password, a biometric scan, and a semi-random number generated by a changing security token device.

7. The device of claim 5, wherein the approval varies based on the level of security associated with the type of user information by the security circuit, and wherein a type of user information with a higher level of security requires a secondary authorization from the user computing device.

8. The device of claim 5, wherein the UIS information circuit is further structured to determine whether user information populated in the user information database includes any discrepancies, wherein the alert indicates any discrepancies and requests a correction of user information.

9. A non-transitory computer-readable storage medium comprising computer-readable instructions stored thereon that when executed by a processor cause the processor to:
   populate, by a UIS information circuit and an associated user information database, a user account with information received from at least one of a user and a plurality of entities;
   receive, by the UIS information circuit over a network via a network interface circuit, a user information request relating to an electronic transaction from an entity computing system associated with an entity;
   compare, by a security circuit of the UIS information circuit, the user information request to a plurality of similar user information requests in a transaction type database, wherein the plurality of similar user information requests are for a same type of transaction as the electronic transaction, and wherein the transaction type database is adaptive, constantly updates user information requested for certain types of transactions, and learns what user information requests to compare based on a given transaction type of prior user information requests;
   selectively flag, by the security circuit, a type of user information requested in the user information request that is inconsistent with the user information requested in the plurality of similar user information requests based on a frequency of the type of user information requested in the plurality of similar user information requests, wherein corresponding flagged information of the user information request is included in an approval request, and wherein the type of user information is flagged based on a level of security of the type of user information, and selectively flagging the type of user information comprises applying a level of flag to the type of user information that corresponds to the frequency of the type of user information requested in the plurality of similar user information requests;
   send, by the security circuit, an alert including the approval request to a user computing device associated with the user over the network, wherein the approval request contains an identification of the type of user information requested in the user information request without revealing the user information in the approval request;

receive, by the security circuit, an approval of the approval request from the user computing device; and provide, by the UIS information circuit and the user information database, the approved user information to the entity computing system to complete the electronic transaction.

10. The non-transitory computer-readable storage medium of claim 9, wherein the approval includes at least one of a password, a biometric scan, and a semi-random number generated by a changing security token device.

11. The non-transitory computer-readable storage medium of claim 9, wherein the approval varies based on the level of security associated with the type of user information by the security circuit, and wherein a type of user information with a higher level of security requires a secondary authorization from the user computing device.

12. The non-transitory computer-readable storage medium of claim 9, wherein the computer-readable instructions stored thereon that when executed by the processor further causes the processor to determine, by the UIS information circuit, whether user information populated in the user information database includes any discrepancies, wherein the alert indicates any discrepancies and requests a correction of user information.

* * * * *